Oct. 17, 1950   D. R. SABRE   2,525,949
MACHINE FOR MANUFACTURING FILES
Filed Oct. 5, 1949   3 Sheets-Sheet 1

INVENTOR.
Daniel R. Sabre
BY
Harry Langsam
Attorney

Oct. 17, 1950     D. R. SABRE     2,525,949
MACHINE FOR MANUFACTURING FILES

Filed Oct. 5, 1949     3 Sheets-Sheet 3

INVENTOR.
Daniel R. Sabre
BY Harry Langsam
Attorney

Patented Oct. 17, 1950

2,525,949

UNITED STATES PATENT OFFICE 2,525,949

MACHINE FOR MANUFACTURING FILES

Daniel R. Sabre, Philadelphia, Pa.

Application October 5, 1949, Serial No. 119,647

4 Claims. (Cl. 76—12)

My invention relates to file manufacturing, and is directed particularly to a continuous process for manufacturing files.

Heretofore, files have been manufactured by subjecting the file blanks to repeated blows with an edged or pointed tool to form upstanding serrations or teeth. This method, while producing a satisfactory tool, is slow and therefore, costly.

An object of my invention is to provide a more rapid process for forming the teeth on file blanks.

Another object of my invention is to provide a machine for manufacturing files continuously by a machining operation, rather than by a hammering operation.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawings in which:

Fig. 4 is a fragmentary front view of one of the cutting tools, together with a fragmentary view of a file produced therewith.

Figure 1:
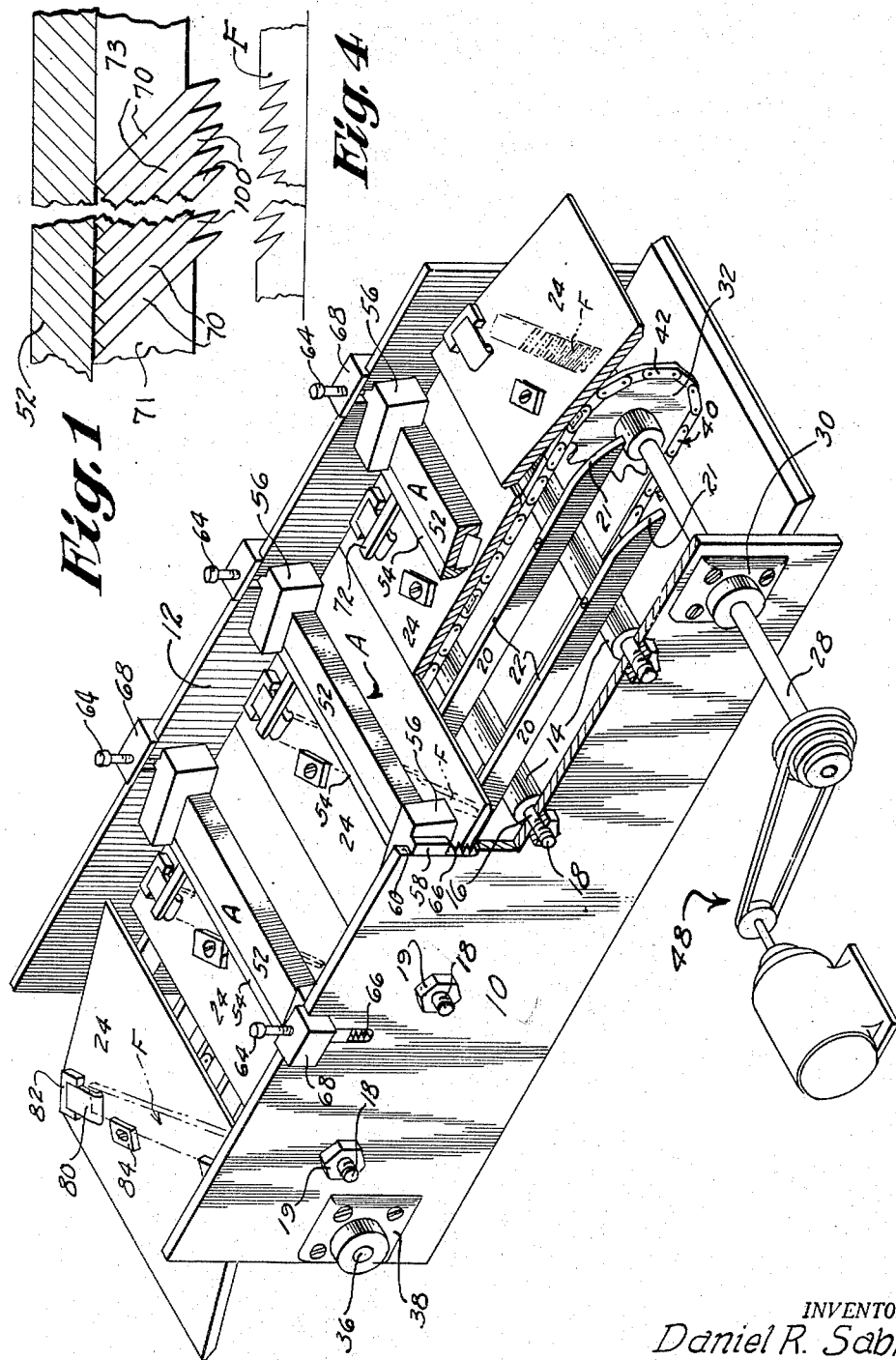
Fig. 1 is a perspective view of the machine.

Briefly, the machine consists of a frame which supports a plurality of tool heads, each carrying a serrated cutting tool. A continuous conveyor chain carries a series of plates, each loaded with a file blank, past the cutting tools, whereby successive light cuts are made to machine the teeth upon one face of the files. At the end of the machining operation, the files are cast off, and the plates are carried back to the feed end of the machine to be re-loaded with file blanks.

Referring now to the drawings, wherein similar reference characters designate similar parts, I show an apparatus for continuously machining teeth upon one face of a file blank.

The frame of the machine consists of side plates 10 and 12, which are connected by a plurality of transverse cylinders 14. Each cylinder 14 has ends of reduced diameter, the ends having an accurately machined portion 16 and a threaded extremity 18 for rigidly bolting the side plates together.

A plurality of longitudinally extending bars 20 having rounded ends 21 rest upon the cylinders 14, their top surfaces 22 forming a smooth bed for the blank supports 24 to slide upon. The bars 20 are rigidly fastened to the cylinders 14 by countersunk screws 26. A drive shaft 28, journalled in bearings 30, mounted on opposite sides of front or delivery end of the machine carries a drive sprocket 32, at its midsection. A similar sprocket 34 (not shown), used as an idler, is mounted on a shaft 36 at the rear, or feed end of the machine. This idler shaft is journalled in side bearings 38. The sprockets 32 and 34 carry an endless roller chain 40, which is made up of conventional links 42, and spaced links 44 having attachment lugs 46.

The drive shaft 28 is driven by a variable speed electric motor drive 48.

Each of the spaced links 44 is fastened, by means of its lugs 46, to a blank-support 24, which is a rectangular plate beveled at its front and rear edges.

Each blank support 24 carries nesting means for positioning a file blank thereon at the proper angle for the desired cut of file. This means will be further described in detail. The supports 24 form a substantially closed surface, except at the ends, where they tilt in passing around the sprocket. This closed surface prevents chips from falling into the interior of the machine. The bevelling or rounding of the front and rear edges of the supports 24 permits these plates to tilt without interference at the adjacent edges.

The tool holders, of which there may be any number, but of which I show three, extend transversely across the machine. Each tool holder generally designated as A, consists of a dovetailed cross-bar 52 having a gib 54 bolted thereto for clamping the cutting tool, generally designated as B. A block 56 attached to each end of the cross-bar 52 has an inclined key 58 which is slidable in vertical keyways 60 cut into the side plates 10 and 12. Vertical adjustment of the tool holder within the keyways is provided by the bolt 64 above and the compression spring 66 below.

The cutting tool is a laminated tool made up of a number of individual blades 70 clamped together on an incline with end spacer blocks 71 and 73 within the holder A. The blades are secured in place by the gib 54. Each blade is edge ground to form a tooth thereon, and, when dull, the blades may be re-ground at the ends 100.

By inclining the blades 70, forwardly-inclined cutting edges are produced on the teeth of the file, to improve the "bite" of the file.

Figure 2:
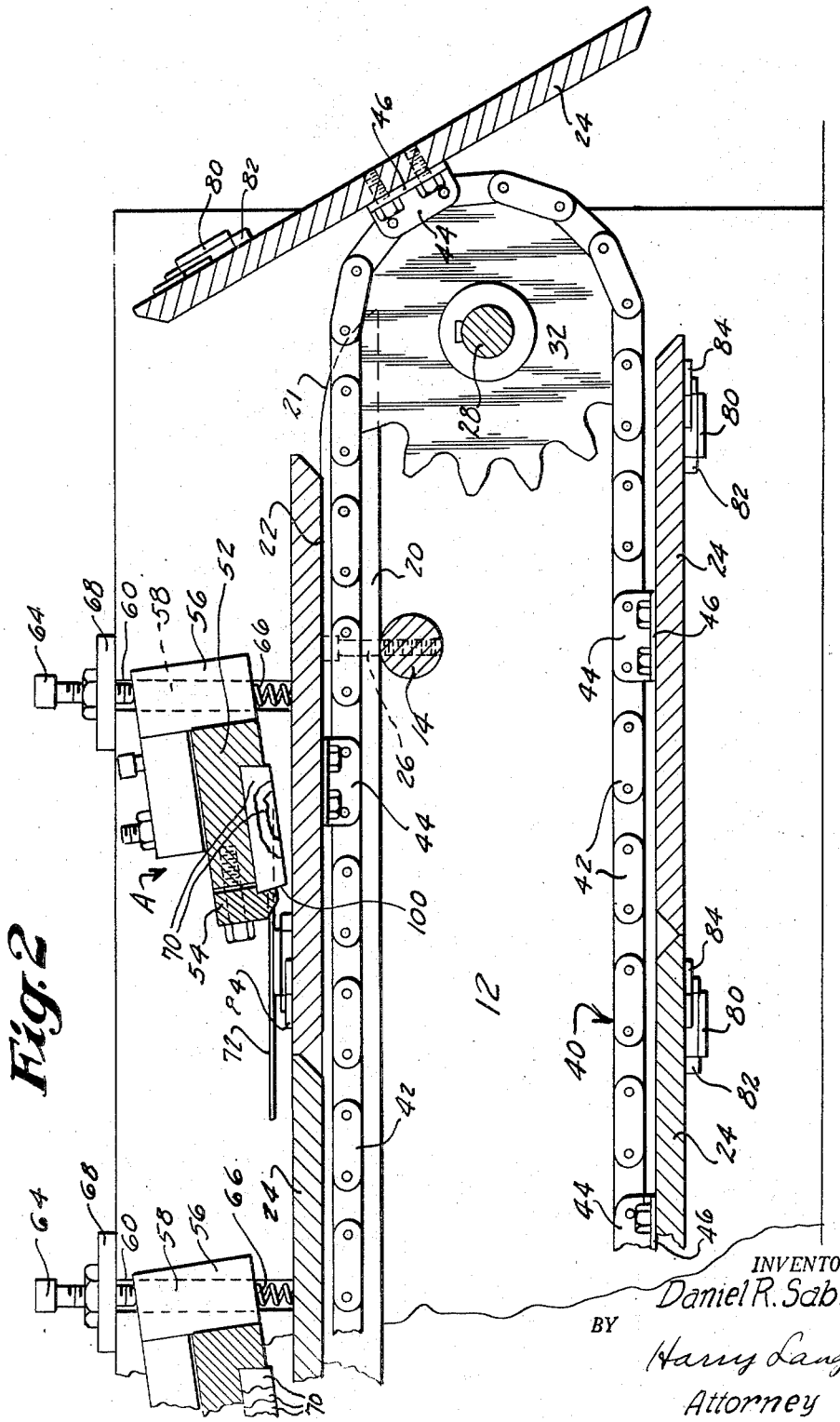
Fig. 2 is a fragmentary side elevation of a portion of the machine.
Figure 3:
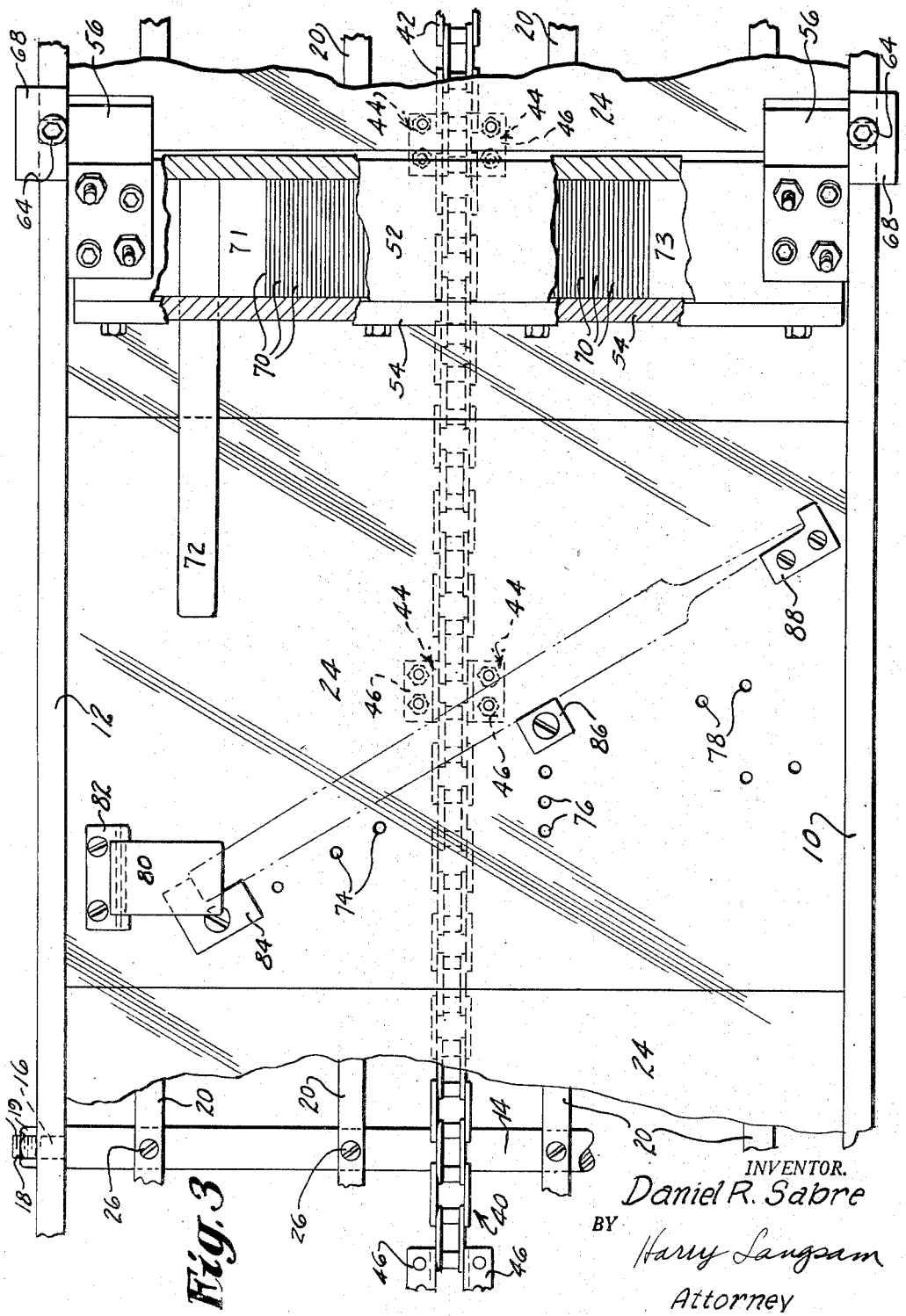
Fig. 3 is a fragmentary top view of a portion of the machine.

The key 58 is cut at a slight angle to impart clearance to the cutting tool, as shown in Fig. 2.

The file blanks, designated generally as F, are loaded one to a plate 24 by an operator standing at the feed end of the machine.

The blanks F are nested in an open fixture, comprising the locating piece 84 at the butt end, the piece 86 at the middle, and the piece 88 at the tang end. Since the machine is to manufacture files of various sizes, and various cuts, the plate 24 is provided with a plurality of tapped holes for adjustably securing the located pieces thereto. The holes 74, 76 and 78 provide means for adjustably securing the locating pieces 84, 86, and 88, respectively, upon the support 24. A plate 80 loosely hinged to a floorplate 82 on the support 24 bears upon the upper surface of the file. As the file approaches the toolholder A, a long bar 72, projecting rearwardly therefrom slidably engages the plate 80, holding the file down during the machining pass. After passing under all of the cutting tools, the finished file is cast off at the front end of the machine, when the plate 24 tilts over, as shown best in Fig. 2.

The bolts 64 are supported by posts 66 attached to the side walls of the machine.

Although my invention has been described in considerable detail, such description is intended as being illustrative rather than limiting, since the invention may be variously embodied, and the scope of the invention is to be determined as claimed.

I claim as my invention:

1. A machine for continuously machining file blanks, comprising a pair of parallel side frames and a bed between an endless chain and comprising a plurality of flexibly-connected plates encircling said bed, a plurality of serrated cutting tools supported between said side frames at intervals along their length, each of said plates being adapted to support a file blank at a forwardly inclined angle, means to align said file blank in a predetermined position, a plate to press downwardly on one end of said file, a long bar extending to one side of said cutters and being adapted to press downwardly on said last named plate whereby said file blank will be held down during the machining pass, and means for rotating said chain whereby each of said plates is moved past said plurality of serrated cutting tools, and whereby file-blanks supported on said plates are formed by said cutting tools.

2. The invention of claim 1 including means for angularly positioning said blanks upon said plates, whereby cuts of various angles may be formed in said blanks.

3. The invention of claim 1 including means for detachably supporting said blanks upon said plates.

4. The invention of claim 1 including means for adjusting the elevation of said cutting tools above said bed.

DANIEL R. SABRE.

REFERENCES CITED

The following references are of record in the file of this patent:

UNITED STATES PATENTS

| Number | Name | Date |
|---|---|---|
| 1,170,010 | Smith | Feb. 1, 1916 |
| 1,433,306 | Slater | Oct. 24, 1922 |
| 1,692,564 | Oakley | Nov. 20, 1928 |
| 1,776,711 | Unger | Sept. 23, 1930 |
| 1,933,080 | Stainfield | Oct. 31, 1933 |